United States Patent
Guha et al.

(10) Patent No.: US 11,247,415 B2
(45) Date of Patent: *Feb. 15, 2022

(54) RESIN TRANSFER MOLDING WITH RAPID CYCLE TIME

(71) Applicant: Continental Structural Plastics, Inc., Auburn Hills, MI (US)

(72) Inventors: Probir Kumar Guha, Auburn Hills, MI (US); Michael J. Siwajek, Auburn Hills, MI (US); Philippe Bonte, Pouance (FR); Marc-Phillippe Toitgans, Pouance (FR); Dominique Boyer, Pouance (FR)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,575

(22) Filed: Dec. 19, 2019

(65) Prior Publication Data
US 2020/0122413 A1 Apr. 23, 2020

Related U.S. Application Data

(63) Continuation-in-part of application No. 15/035,163, filed as application No. PCT/US2014/068326 on Dec. 3, 2014, now abandoned.
(Continued)

(51) Int. Cl.
*B29C 70/48* (2006.01)
*B29C 45/02* (2006.01)
(Continued)

(52) U.S. Cl.
CPC .......... *B29C 70/48* (2013.01); *B29C 45/0005* (2013.01); *B29C 45/02* (2013.01);
(Continued)

(58) Field of Classification Search
CPC ..... B29B 45/02; B29C 45/78; B29C 45/0005; B29C 45/77; B29C 70/48; B29C 70/548;
(Continued)

(56) References Cited

U.S. PATENT DOCUMENTS

| 2002/0052440 A1* | 5/2002 | Tochioka | B29B 9/14 524/494 |
| 2007/0182071 A1* | 8/2007 | Sekido | B29C 33/0066 264/511 |
| 2010/0093911 A1* | 4/2010 | Guha | C08F 283/00 524/433 |

FOREIGN PATENT DOCUMENTS

| DE | 29720598 U1 * | 2/1998 |
| EP | 1721719 A1 | 11/2006 |

(Continued)

OTHER PUBLICATIONS

Machine translation of JP-2010089501-A (Year: 2010).*
(Continued)

*Primary Examiner* — Leith S Shafi
(74) *Attorney, Agent, or Firm* — Blue Filament Law PLLC

(57) ABSTRACT

A process for resin transfer molding (RTM) with staggered injection of a resin is provided that injects resin into a plurality of injection ports of a mold. The temperature and pressure applied to the mold are controlled during injection to limit promote rapid filling of the mold cavity. The injection ports are activated for injecting the resin in any order of individually, in groups, or pairings. Fibers are readily added to the mold separately or within the resin. Cycle times of from 1 to 5 minutes are provided for the process.

11 Claims, 4 Drawing Sheets

Related U.S. Application Data

(60) Provisional application No. 61/910,974, filed on Dec. 3, 2013.

(51) Int. Cl.
  *B29C 45/77*    (2006.01)
  *B29C 45/00*    (2006.01)
  *B29C 45/76*    (2006.01)
  *B29K 311/10*   (2006.01)
  *B29C 45/78*    (2006.01)

(52) U.S. Cl.
  CPC ............ *B29C 45/762* (2013.01); *B29C 45/77* (2013.01); *B29C 45/78* (2013.01); *B29C 2045/0006* (2013.01); *B29C 2945/76561* (2013.01); *B29K 2311/10* (2013.01)

(58) Field of Classification Search
  CPC ........... B29C 2945/76732; B29C 2945/76688; B29C 33/0061; B29C 33/10; B29C 33/00; B29C 45/762; B29C 2045/0006; B29C 2945/76561; B29C 70/443; B29C 2045/0008; B29K 2311/10
  See application file for complete search history.

(56) References Cited

FOREIGN PATENT DOCUMENTS

| | | | | |
|---|---|---|---|---|
| JP | 2010089501 | A | * | 4/2010 |
| JP | 2011168010 | A | * | 9/2011 |
| KR | 20110048245 | A | * | 5/2011 |
| NL | 2322713 | A1 | * | 5/2011 |

OTHER PUBLICATIONS

Machine translation of KR-20110048245-A. (Year: 2011).*
U.S. Appl. No. 15/025,163, filed May 6, 2016.
Communication Pursuant to Article 94(3) EPC issued in European Patent Appln. No. 14868247.9, dated Aug. 10, 2020.

* cited by examiner

RESIN TRANSFER MOLDING WITH RAPID CYCLE TIME

RELATED APPLICATIONS

This application is a continuation in part of U.S. application Ser. No. 15/035,163, filed on May 6, 2016, which claims benefit of International Application Number PCT/US2014/068326, filed Dec. 3, 2014, and claims priority benefit of U.S. Provisional Application Ser. No. 61/910,974, filed Dec. 3, 2013, the contents of which are hereby incorporated by reference.

FIELD OF THE INVENTION

The present invention in general relates to resin transfer molding and in particular to an improved resin transfer molding process with a staggered injection of resin by time and position in a multipoint injection system.

BACKGROUND OF THE INVENTION

Resin transfer molding (RTM) is a method of fabricating composite structures with high strength, complex geometries, tight dimensional tolerances, and part quality typically required for automotive and aerospace applications. RTM uses a closed mold commonly made of aluminum with a fiber "lay-up" such as graphite placed into the mold. The mold is closed, sealed, heated, and placed under vacuum. A room temperature (20° C.) or heated resin is then injected into the mold to impregnate the fiber layup. Having the mold heated and under vacuum assists the resin flow. The mold is then held at a temperature sufficient to cure the resin. Typically, a resin experiences three distinct states during the RTM process; a viscous state during injection, a jelling state during which the viscosity of the resin changes to a higher viscosity, and a cure time when the resin materials chemically crosslink and the resin hardens. Molds used for RTM have one or more injection ports for introducing the resin, and at least one exhaust port for gas and excess resin to leave the mold. Multiport injection molds are typically used for larger parts that have an increased processing time.

A common problem encountered during the RTM process is a non-uniform flow of the resin, where the resin experiences a change in viscosity as the resin travels away from the injection point. Furthermore, as shown in the graph of FIG. 1 as the time of processing progresses the pressure and temperature experienced by the resin decreases as a function of time. The aforementioned problems experienced during the RTM process contribute to defects in formed parts.

Existing RTM molds, such as that disclosed in U.S. Pat. No. 7,943,078 to Sekido et al. have attempted to address some of the above mentioned shortcomings, however have presented their own limiting issues. As an initial matter, the U.S. Pat. No. 7,943,078 requires the laying up of a fiber substrate within the mold cavity as opposed to injecting a resin that contains fibers therein, which requires additional manufacturing steps, increases costs, and reduces throughput. Once the fiber substrate is pre-positioned within the mold cavity of the U.S. Pat. No. 7,943,078 patent, a fiberless resin is injected into the mold to impregnate the fiber substrate. The resin is injected from a plurality of injection ports in an indirect manner. That is, the resin is injected from injection ports into resin injection runners and once the resin has filled the resin injection runners, the resin flows through the resin injection film gates and finally into the mold cavity. The U.S. Pat. No. 7,943,078 patent provides an exhaust port on one side of the mold and injection ports on all other side of the mold, including an injection port that is in line and parallel to the exhaust port. To this end, the U.S. Pat. No. 7,943,078 teaches that the entire circumference of the product to be molded is covered by either an injection line or exhaust line namely, the resin film gates. Thus, the flow of the resin injected takes up a unidirectional flow pattern toward the exhaust port, so even if fibers were included in the injected resin, the fibers would orient in the direction of the resin flow, thereby resulting in a weak molded product. Additionally, given that the resin is indirectly injected in the U.S. Pat. No. 7,943,078 such that the resin is injected from injection ports into resin injection runners, which once the resin has filled the resin injection runners, flows through the resin injection film gates and finally into the mold cavity, the RTM mold of the U.S. Pat. No. 7,943,078 is incompatible with the injection of resin containing fibers. That is, if the injected resin were to contain fibers, those fibers would accumulate in the injection runners and injection gates and not make it into the mold cavity, resulting in wasted material at a wasted cost, clogged equipment, and additional labor time for cleaning the clogged equipment.

Thus, there exists a need for an improved RTM multiport injection process that minimizes both production defects and cycle time.

SUMMARY OF THE INVENTION

A process for resin transfer molding (RTM) with staggered injection of a resin is provided that injects resin into a plurality of injection ports of a mold. The temperature and pressure applied to the mold are controlled during injection to limit promote rapid filling of the mold cavity. The injection ports are activated for injecting the resin in any order of individually, in groups, or pairings. Fibers are readily added to the mold separately or within the resin. Cycle times of from 1 to 5 minutes are provided for the process.

DETAILED DESCRIPTION OF THE INVENTION

The present invention has utility as an improved resin transfer molding (RTM) process with a staggered injection of resin by time and position in a multipoint injection system. The staggered introduction of resin in a mold provides for an improved pressure and temperature profile versus time for the resin used for forming parts versus existing RTM processes that simultaneously inject resin. The staggered introduction of resin in embodiments of the inventive process provide for improved product yields with fewer formed part defects resulting from non-impregnated portions, thereby improving the quality of the molded product. Furthermore, product cycle time is also reduced by staggering the injection of resin in a multiport mold versus the existing process of simultaneous injection of resin in a multiport mold. It has been observed that cycle time for forming parts have been reduced from approximately 10-60 minutes to three to five minutes with the inventive process of staggering the injection of resin in a multiport mold.

Resins used in embodiments of the inventive staggered RTM process include thermosetting resins such as epoxy; urethanes; polyesters, and vinylesters; that are low in viscosity and easy to be impregnated into reinforcing fibers. These resins illustratively include epoxy resin, an unsaturated polyester resin, a polyvinylester resin, a phenolic resin, a guanamine resin, a polyimide resin such as bismaleimide triazine resin, a furan resin, a polyurethane resin, a polydiarylphthalate resin, a melamine resin, a urea resin, an amino resin, etc. Fibers may be introduced to the resin used in certain embodiments of the inventive staggered RTM process to strengthen formed parts including glass, carbon, and other synthetic fibers, as well as natural fibers. Natural fibers may include coconut fibers, bamboo fibers, sugar cane fibers, banana skin fibers, etc.

Figure 1:
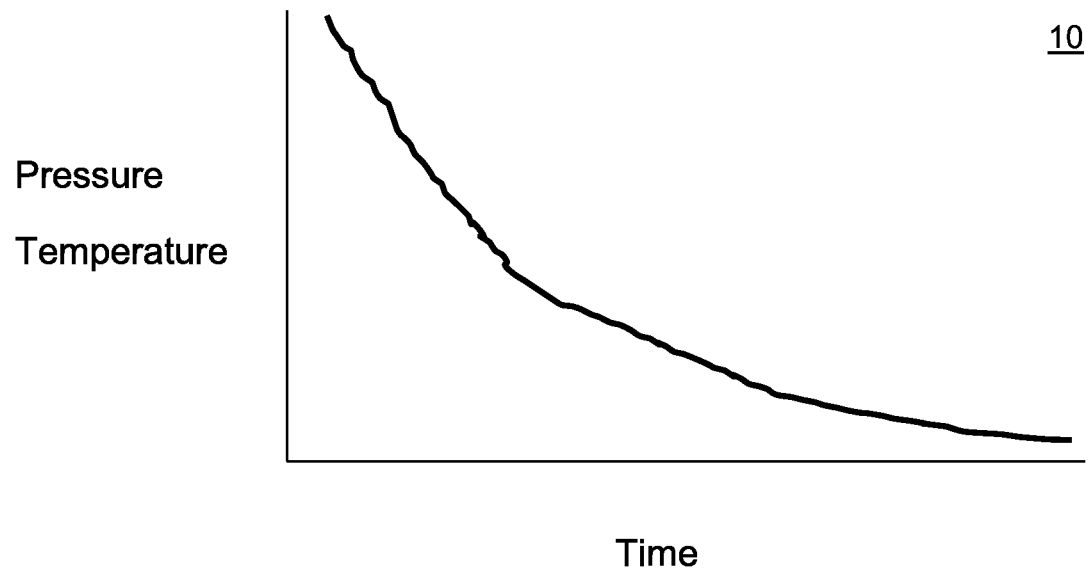
FIG. 1 is a graph showing the typical response curve as the time of processing progresses the pressure and temperature experienced by the resin decreases as a function of time.
Figure 2:
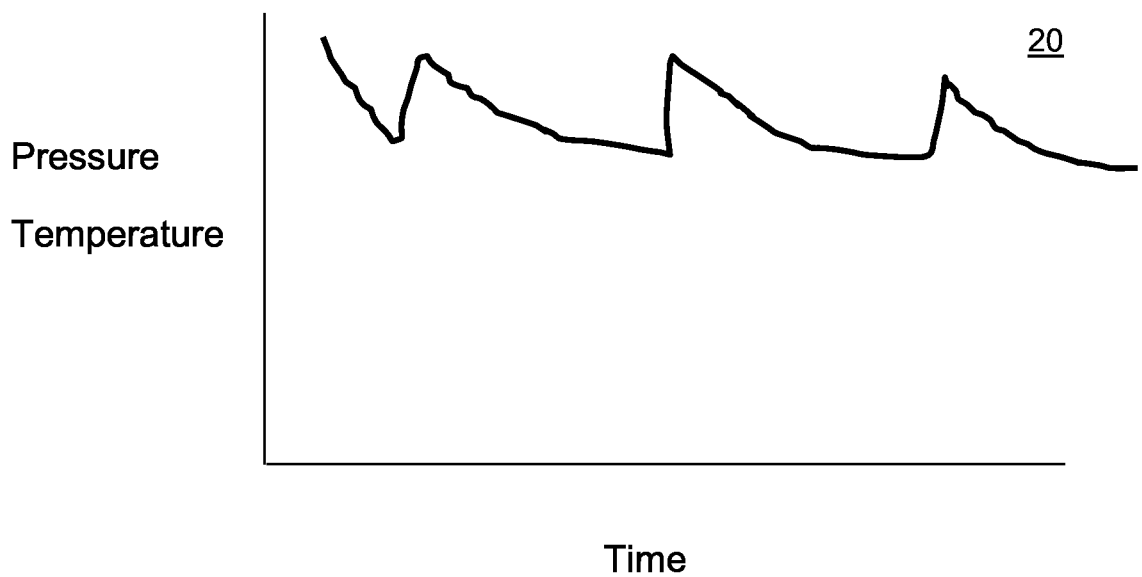
FIG. 2 is a graph showing the response curve of pressure and temperature as a function of time for resin with staggered injection in a multiport RTM mold according to an embodiment of the inventive process.

Referring now to FIG. 2, a graph 20 showing the response curve of pressure and temperature as a function of time for resin with staggered injection in a multiport RTM mold according to an embodiment of the inventive process. As can be seen as compared to the graph 10 of FIG. 1 for a simultaneous injected part, the rapid decline of pressure and temperature during the processing of a molded part in the mold is avoided compared to conventional RTM process, and the temperature and pressure is maintained during the RTM process of embodiments of the invention to increase cycle time of molding a part.

Figure 3:
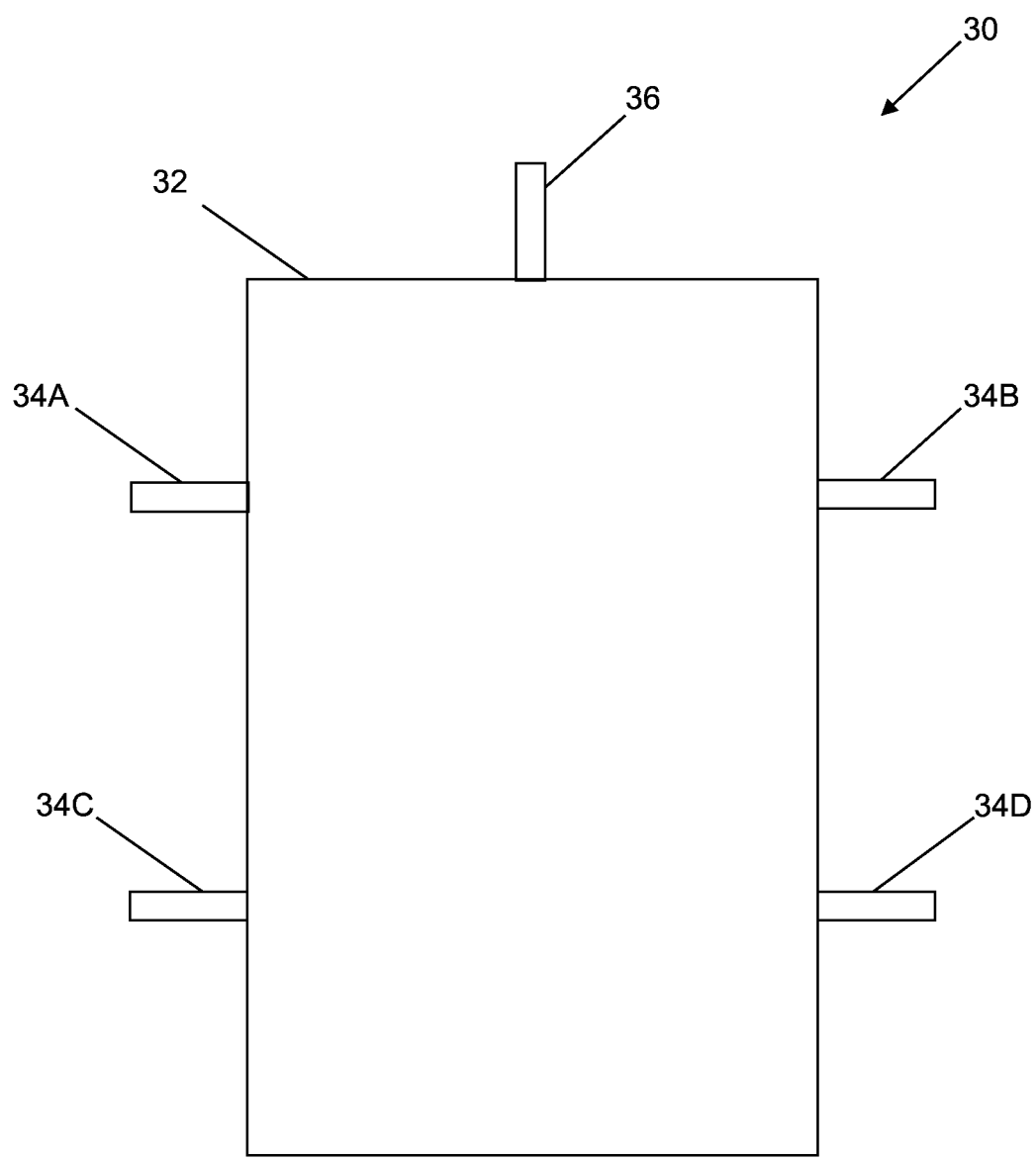
FIG. 3 is a plan view of a multiport RTM mold with four injection ports for staggered resin injection according to embodiments of the invention.

FIG. 3 is a plan view of a multiport RTM system 30 with a mold 32 with four injection ports 34A-34C for staggered resin injection and an exhaust port 36 according to embodiments of the invention. In embodiments of the staggered RTM process the injection ports may be activated in any order both individually, and in groups, or pairings. For example, injection ports 34A and 34B may be turned on as a pair and alternated with injection ports 34C and 34D as a second pair, where the adjacent pairings (34A-34B, 34C-34D) inject resin at alternating times. In certain embodiments, cross-pairings of injection ports (34A-34D) and (34B-34C) may inject resin at alternating times. In certain embodiments, the injection ports 34A, 34B, 34C, and 34D are each individually turned on and off in sequential clockwise or counter clockwise order. While four such ports 34A-34D are shown it is appreciated that the number of injection ports ranges from 1 to 10 in various inventive embodiments, while in other embodiments, from 2 to 6 ports and in still other embodiments 2 or 3 ports are used.

Figure 4:
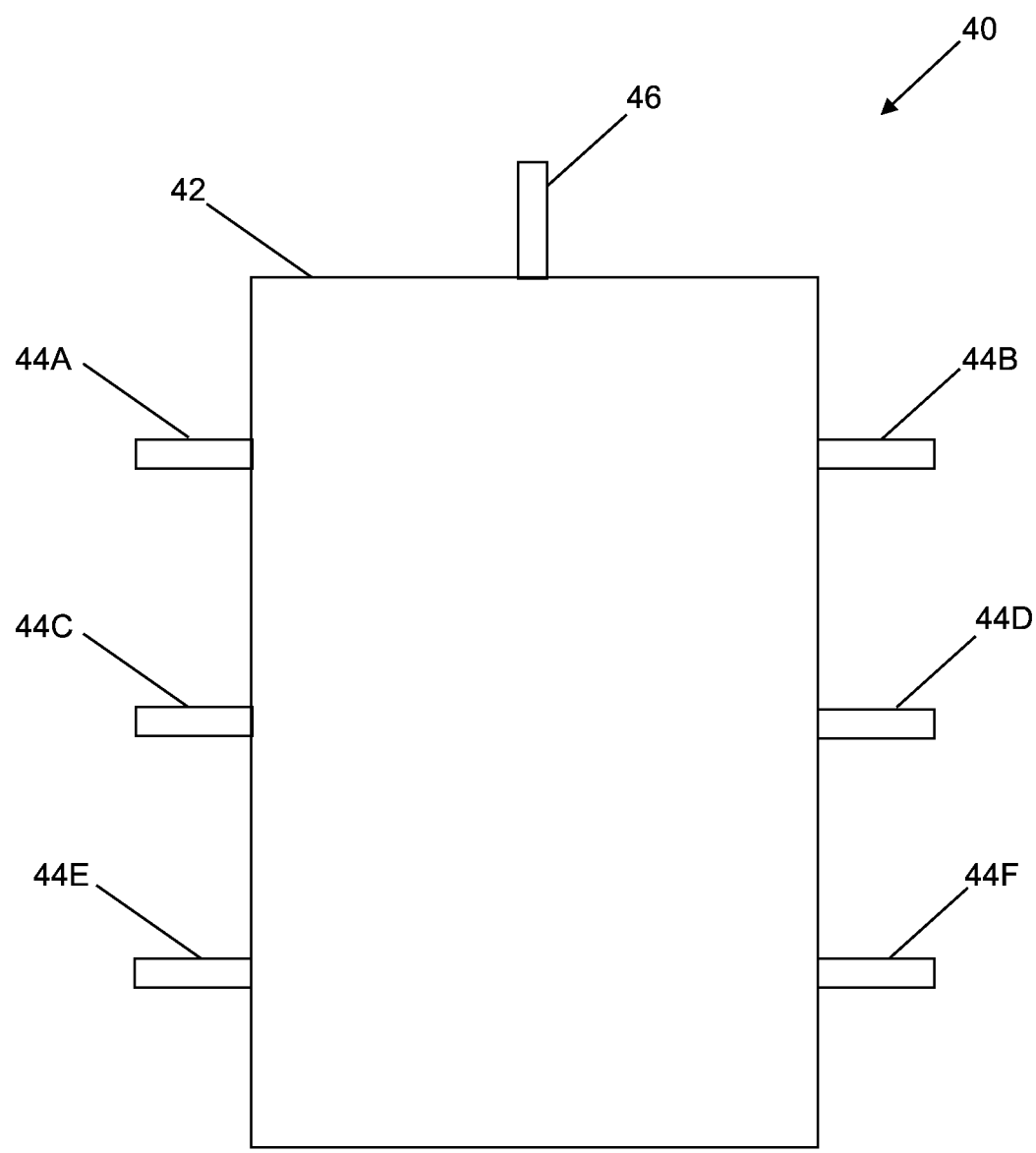
FIG. 4 is a plan view of a multiport RTM mold with six injection ports for staggered resin injection according to embodiments of the invention.

FIG. 4 is a plan view of a multiport RTM system 40 with a mold 42 with six injection ports 44A-44F for staggered resin injection and an exhaust port 46 according to embodiments of the invention. As was discussed with respect to the inventive embodiment of FIG. 3, the injection ports 44A-44F may be activated in any order both individually, and in groups, or pairings. As should be apparent the number possible combinations and configurations for activating and injecting resin through the various injection ports increases as the number of available injection ports increases for a given mold.

As shown in FIGS. 3 and 4, the injection ports 34A-34D and 44A-44F, respectively, are all positioned orthogonally to the exhaust port 36, 46, respectively. According to embodiments of the present invention, there is no injection port that is in line with or parallel to the exhaust port 36, 46, respectively. This configuration ensures that the resin that is injected into the mold cavity and the fibers contained in the resin do not take up a unidirectional flow pattern. By preventing such unidirectional flow of the resin within the mold cavity, the fibers contained in the flowing resin remain randomized in terms of direction and orientation, which results in a stronger molded part. The orientation of the fibers in a cured part creates a difference in strength in certain directions (anisotropy), particularly given that the present invention does not result in less fibers in edge areas as the resin flows given the staggered use of injection ports by activating the injection ports for injecting said resin in any order of individually or in groups. In this way, the resin flow (and the fibers being carried with the resin) is limited in distance and pressure. The opposing flows offset one another in terms of flow vectors to neutralize the orientation problem.

The injection ports 34A-34D and 44A-44F are configured to inject resin and fibers contained therein directly into the mold cavity, which allows the resin flow pattern to remain multidirectional as it enters the mold cavity from the two sides of the mold and flows toward to the single exhaust port. According to embodiments, the multiport system 30, 40 additionally includes a second exhaust port positioned orthogonally to the injection ports on an opposite wall to the first exhaust ports 36,46, which also ensures that the resin does not take up a unidirectional flow pattern.

In embodiments of the inventive staggered RTM system and process; the firing or activation order and patterns of usage of the resin injectors are preprogrammed into a numerical controller or computing device with a processor and a storage medium for storing and executing the programs. In an embodiment of the inventive staggered RTM system, the numerical controller may also control a carousal with multiple injection mold fixtures that can be automatically loaded into position for the staggered multiport injection process, and then removed and another mold fixture can be moved into position while a formed part is removed from the first fixture.

Figure 5:
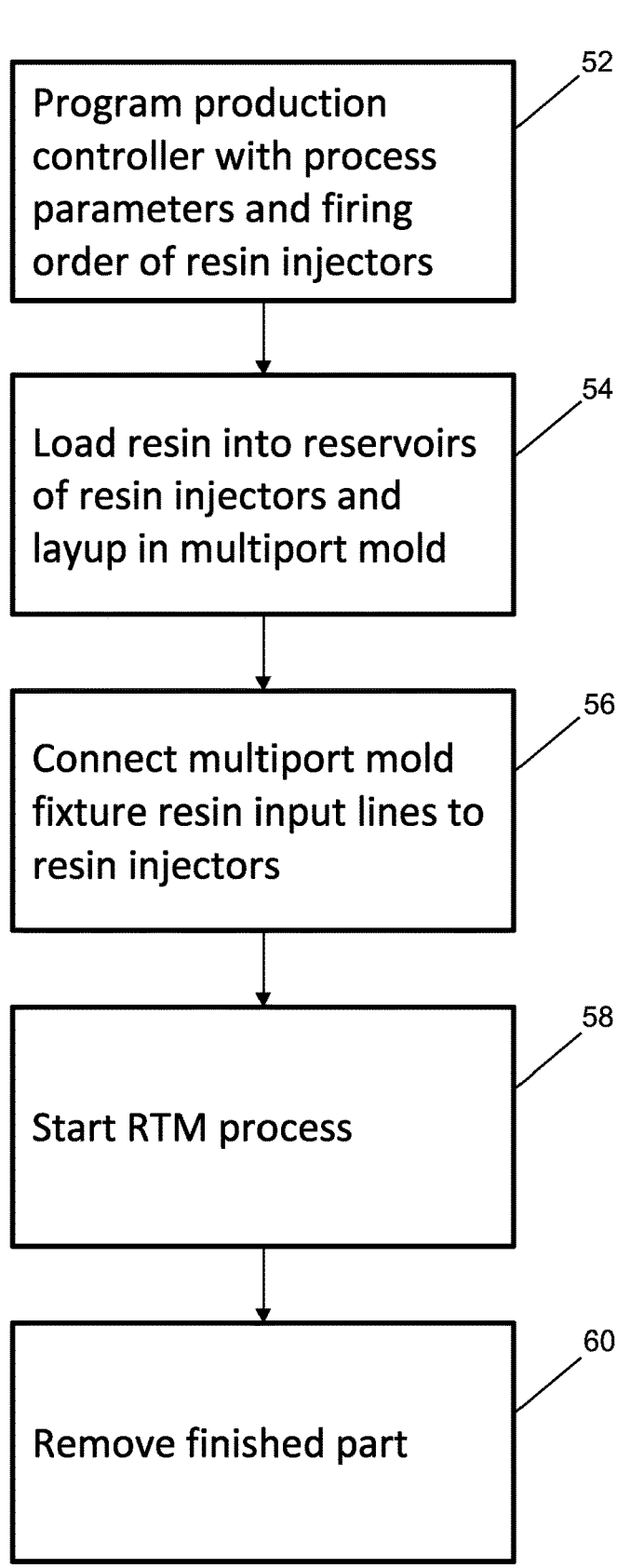
FIG. 5 is a flowchart of a production process of the staggered multiport RTM process according to embodiments of the invention.

FIG. 5 is a flowchart of a production process 50 of the staggered multiport RTM process according to embodiments of the invention. The process starts with an operator programming a production controller (step 52) with process parameters for a particular molded part to be formed with the RTM process using a multi resin injection port mold. Process parameters including pressure, temperature, and firing sequence of the resin injectors are set by the operator based on the resin material and part to be formed in the RTM process. The operator loads the resin for forming the part into the reservoirs of the resin injectors, as well as the layup into the mold (step 54). The multiport mold fixture resin input lines are hooked up to the resin injectors (step 56). The RTM process is started (step 58), and the completed part is removed from the mold (step 60).

The foregoing description is illustrative of particular embodiments of the invention, but is not meant to be a limitation upon the practice thereof. The following claims, including all equivalents thereof, are intended to define the scope of the invention.

The invention claimed is:

1. A process for resin transfer molding (RTM) with staggered injection of a resin containing reinforcing fibers, the process comprising:
   providing a multiport RTM mold consisting of a mold cavity, an exhaust port, and injection ports, wherein all of the injection ports are positioned only orthogonally to the exhaust port;
   injecting said resin containing reinforcing fibers into the mold cavity from the injection ports;
   controlling temperature and pressure applied to said mold; and
   wherein the steps of the injecting and the controlling have a cycle time of 1 to 5 minutes and wherein said injection ports are activated for injecting said resin containing reinforcing fibers in any order of individually or in groups.

2. The process of claim 1, wherein said resin is at least one of an epoxy resin, an unsaturated polyester resin, a polyvinylester resin, a phenolic resin, a guanamine resin, a polyimide resin, a bismaleimide triazine resin, a furan resin, a polyurethane resin, a polydiarylphthalate resin, a melamine resin, a urea resin, or an amino resin.

3. The process of claim 1, wherein said fibers are at least one of glass, carbon, or other synthetic fibers.

4. The process of claim 1, wherein said fibers are natural fibers.

5. The process of claim 4, wherein said natural fibers are at least one of coconut fibers, bamboo fibers, sugar cane fibers, or banana skin fibers.

6. The process of claim 1, wherein said injection ports are activated for injecting resin in a sequential clockwise or counter clockwise order.

7. The process of claim 1, wherein said injection ports are activated based on a computer program.

8. The process of claim 1, wherein said injection ports are from 2 to 6 injection ports.

9. The process of claim 1, wherein said injection ports are 3 injection ports.

10. The process of claim 1, wherein the controlling limits a decline of pressure and temperature during formation of a molded part in said mold.

11. A process for resin transfer molding (RTM) with staggered injection of a resin containing reinforcing fibers, the process comprising:
   providing a multiport RTM mold having a mold cavity, an exhaust port, and injection ports, wherein all of the injection ports present are positioned only orthogonally to the exhaust port without any injection port in line with or parallel to the exhaust port;
   injecting said resin containing reinforcing fibers into the mold cavity from the injection ports such that the fibers contained in the resin are randomized in terms of direction and orientation;
   controlling temperature and pressure applied to said mold; and
   wherein the steps of the injecting and the controlling have a cycle time of 1 to 5 minutes and wherein said injection ports are activated for injecting said resin containing reinforcing fibers in any order of individually or in groups.

* * * * *